United States Patent
Onodera et al.

(10) Patent No.: US 6,616,860 B1
(45) Date of Patent: Sep. 9, 2003

(54) BIOPOLYMER COMPOSITE ION-EXCHANGER WITH HIGH CESIUM SELECTIVITY AND ITS MANUFACTURING METHOD

(75) Inventors: Yoshio Onodera, Miyagi (JP); Hitoshi Mimura, Miyagi (JP); Takashi Iwasaki, Miyagi (JP); Hiromichi Hayashi, Miyagi (JP); Takeo Ebina, Miyagi (JP)

(73) Assignee: Agency of Industrial Science and Technology, Tokyo (JP)

( * ) Notice: Subject to any disclaimer, the term of this patent is extended or adjusted under 35 U.S.C. 154(b) by 0 days.

(21) Appl. No.: 09/504,802

(22) Filed: Feb. 15, 2000

(30) Foreign Application Priority Data

Feb. 16, 1999 (JP) .............................. 11-037743
Dec. 3, 1999 (JP) .............................. 11-345389

(51) Int. Cl.⁷ .......................... B01J 20/02; B01J 20/22; B01J 20/24; B01J 20/30; B01D 15/04; G21F 9/12

(52) U.S. Cl. ........................... 252/184; 516/78; 516/88; 516/105; 210/681

(58) Field of Search .......................... 252/184; 516/78, 516/88, 105; 210/681

(56) References Cited

U.S. PATENT DOCUMENTS

| | | | | |
|---|---|---|---|---|
| 4,971,698 A | * | 11/1990 | Weber et al. ................. | 210/615 |
| 5,015,448 A | * | 5/1991 | Vorlop et al. ................. | 423/24 |
| 5,270,177 A | * | 12/1993 | Ramos Lazcano et al. ... | 435/72 |
| 5,977,023 A | * | 11/1999 | Inoue et al. ................. | 504/116 |
| 6,299,867 B1 | * | 10/2001 | Aoyagi et al. ............. | 424/76.1 |

FOREIGN PATENT DOCUMENTS

JP          09-291479        *   9/1997

OTHER PUBLICATIONS

Derwent –Acc–No.: 1998–037396.*
Federico Mijangos, et al. "Equilibrium Studies of the Application of Polymeric Resins Aggregated with Calcium Alginate," Proceedings of the Ion–Exchange '95 Conference, 1995, pp. 314–322.
Christopher D. Gilson, et al. "Calcium Alginate Bead Manufacture: With and Without Immobilised Yeast. Drop Formation at a Two–Fluid Nozzle," J. Chem. Tech. Biotechnol., vol. 62, 1995, pp. 227–232.
David A. Rees, et al. "Secondary and Tertiary Structure of Polysaccharides in Solutions and Gels," Angew. Chem. Int. Ed. Engl. vol. 16, 1977, pp. 214–224.
Yasuhiro Konishi, et al. "Recovery of Zinc, Cadmium, and Lanthanum by Biopolymer Gel Particles of Alginic Acid," Separation Science and Technology, vol. 28(9), 1993, pp. 1691–1702.

* cited by examiner

*Primary Examiner*—Joseph D. Anthony
(74) *Attorney, Agent, or Firm*—Oblon, Spivak, McClelland, Maier & Neustadt, P.C.

(57) ABSTRACT

The present invention provides an easy-to-handle biopolymer composite ion-exchanger with high cesium selectivity, and method for manufacturing this ion-exchanger with ease and good reproducibility, and relates to a cesium separation/recovery agent comprising a composite ion-exchanger with high cesium selectivity by employing a calcium alginate gel as a matrix and loading this matrix with an inorganic ion-exchanger; and to a manufacturing method therefor.

4 Claims, 4 Drawing Sheets

Breakthrough Curve of Cesium from Nitric Acid Solution in GC-1 Column

Column: 0.7 × 6.8 cm; GC-1, 1 g
Feed Solution: $[Cs^+]$ 3 × $10^{-3}$ M $CsNO_3$ – 0.1 M/1 M $HNO_3$
Flow Rate: 0.54 $cm^3 cm^{-2} min^{-1}$
Temperature: 25 °C Breakthrough Curve of Cesium from Nitric Acid Solution in GC-1 Column Column: 0.7 × 6.8 cm; GC-1, 1 g
Feed Solution: [$Cs^+$] $3 \times 10^{-3}$ M $CsNO_3$ − 0.1 M/1 M $HNO_3$
Flow Rate: 0.54 $cm^3 cm^{-2} min^{-1}$
Temperature: 25 °C Elution Curve of Cesium from GC-1 Column Column: GC-1, 1 g; 0.24 mmol Cs Sorbed
Feed Solution: 2.5 M $NH_4NO_3$ - 2.5 M $HNO_3$
Flow Rate: 0.54 $cm^3 cm^{-2} min^{-1}$
Temperature: 25 °C Breakthrough Curve of Cesium from a mixed solution of $NaNO_3$ – $HNO_3$ in WP-Alg Column Column: 0.7 × 9.4 cm; WP-Alg, 1 g
Feed Solution: $7.5 \times 10^{-5}$ M $CsNO_3$ – 4.5 M $NaNO_3$ – 1 M $HNO_3$
Flow Rate: 0.21 mL/min
Temperature: 25 °C Elution Curve of Cesium from WP-Alg Column Column: WP-Alg, 1 g; 0.013 mmol Cs Sorbed
Feed Solution: 5 M $NH_4NO_3$ – 1 M $HNO_3$
Flow Rate: 0.21 mL/min
Temperature: 25 °C

BIOPOLYMER COMPOSITE ION-EXCHANGER WITH HIGH CESIUM SELECTIVITY AND ITS MANUFACTURING METHOD

BACKGROUND OF THE INVENTION

1. Field of the Invention

The present invention relates to a biopolymer composite ion-exchanger with high cesium selectivity that is used to selectively and efficiently separate/recover traces of dissolved cesium from treatment solutions containing various components and resulting from resource recovery, wastewater treatment, chemical analysis, and other procedures; and to a manufacturing method therefor.

2. Description of the Prior Art

Cesium is a metal element of comparatively high average value used in the production of pharmaceuticals, photoelectronic conversion elements, optical crystals, optical glass, and the like. As a natural resource, cesium is widely distributed as an element accompanying other alkali metals, but is not very abundant in the Earth's crust, where its average content is 3 g/t ("Ippan Chikyu Kagaku (General Geochemistry)," pp. 54–55, Iwanami Shoten Publishers (1979)). Cesium is mostly produced from pollucite (cesium ore) and is also recovered as a by-product resulting from the production of lithium or potassium from lepidolite or carnallite ("Kisho Kinzoku Data Book (Scarce Metal Data Book)," Compiled by Metal Mining Agency of Japan (1968)). Even these mineral resources are distributed unevenly across the globe, so selective extraction of trace amounts of cesium dissolved in seawater, geothermal water, and the like has been studied in order to secure this resource (Doctoral Dissertation, Engineering No. 1603, Tohoku University). In addition, the radioactive isotope cesium-137 can be used as a radiation source in medicine and various industries, so selective recovery of this isotope from radioactive liquid waste is an important topic of investigation in terms of volume reduction and efficient use of such radioactive liquid waste (IAEA Technical Rep. Series, No. 353, 1993).

To selectively separate and recover cesium dissolved in trace amounts in aqueous solutions, it has been proposed to use cation-exchange resin techniques (for example, "Ion-Exchangers in Analytical Chemistry. Their Properties and Use in Inorganic Chemistry," 14, 170–173, Elsevier (1982)), inorganic ion-sorption techniques (for example, "Ion-Exchangers in Analytical Chemistry. Their Properties and Use in Inorganic Chemistry," 14, 173–190, Elsevier (1982)), or solvent extraction techniques (for example, "Solvent Extraction Manual," 202, 403, Technika Publishing House, Kiev (1972)). At the present stage, selective recovery from treatment solutions by inorganic ion exchange is the most viable option in terms of recovery costs (Doctoral Dissertation, Engineering No. 1603, Tohoku University). This is because in comparison with organic ion-exchangers, inorganic ion-exchangers are commonly more selective to specific ions or groups ("Fundamentals of Ion Exchange and Advanced Separation Technology," Kodansha Scientific (1991)) and have better heat resistance, radiation resistance, and other physicochemical properties ("Topics in Inorganic & General Chemistry," Elsevier, Amsterdam, 1964)).

The following materials are known as inorganic ion-exchangers highly selective to celium: zeolites ("Zeolite Molecular Sieves—Structure, Chemistry, and Use," John Wiley & Sons (1974)), crystalline tetratitanic acid (Nihon Kagaku Kaishi, 10, 1656 (1981)), smectite (Clays Clay Min., 28, 142 (1980)), insoluble ferrocyanides (Proc. of the Symp. on Waste Management, Tucson, 2, 1687 (1993)), ammonium molybdophosphate (Nature, 181, 1530 (1958)), silicon titanates (Ind. Eng. Chem. Res., 33, 2702 (1994)), and the like.

Of these, insoluble ferrocyanides, ammonium molybdophosphate, and silicon titanates in particular have much higher cesium selectivity than do other inorganic ion-exchangers, and are expected to be used as treatment agents for radioactive wastewater, which are typical treatment solutions based on a variety of components (Radiochimica Acta, 40, 49–56 (1986)). In the case of insoluble ferrocyanides, however, it is known that the sorbed cesium is very difficult to elute despite the high cesium selectivity of the material, and significant problems are encountered in terms of recovery and use. Silicon titanates are disadvantageous in that their cesium selectivity diminishes considerably at low pH due to their unstable structure (Ind. Eng. Chem. Res., 33, 2702 (1994)). By contrast, ammonium molybdophosphate has high acid resistance and exceptionally high cesium selectivity, sorbed cesium is completely eluted and recovered into ammonium salts solutions, and the ion-exchanger can be regenerated at the same time (Nature, 181, 1530 (1958)).

At the present stage, therefore, ammonium molybdophosphate is expected to be the most practical inorganic ion-exchanger for use in the separation and recovery of cesium (Radiochimica Acta, 40, 49 (1986)).

However, conventionally synthesized ammonium molybdophosphate is a product with fine powder form (J. Inorg. Nucl. Chem., 27, 227 (1965)), and is thus difficult to handle during solution contact or solid-liquid separation. Compositioning techniques have therefore been studied as a way of using asbestos (J. Inorg. Nucl. Chem., 12, 95 (1959)), silica gels (J. Radioanal. Chem., 21, 381 (1974)), Amberlite XAD-7 (J. Radioanal. Chem., 56, 13 (1980)), polyacrylonitrile (Sep. Sci. Technol., 32, 37 (1997)), titanium phosphate ("Progress in Ion Exchange—Advances and Applications," pp. 289–297, Royal Society of Chemistry (1995)), and the like as matrices in order to improve the handling of such inorganic ion-exchangers.

The aforementioned compositioning techniques are disadvantageous, however, in that they involve performing complex preparation procedures and that the resulting composite lacks reproducibility in terms of ion-exchange characteristics (Radiochimica Acta, 40, 49 (1986)), making these techniques completely unusable on a practical scale. An urgent need therefore exists for developing a new technique for obtaining the inorganic ion-exchangers with greater ease and higher reproducibility.

With the foregoing in view, it is an object of the present invention to provide a manufacturing method of inorganic ion-exchangers, particularly, a novel biopolymer composite ion-exchanger with high cesium selectivity that can be used to sorb/recover cesium from various solutions in an efficient manner, and to provide a highly convenient and reproducible manufacturing method therefor.

SUMMARY OF THE INVENTION

The present invention provides an easy-to-handle biopolymer composite ion-exchanger with high cesium selectivity, and a method for manufacturing this ion-exchanger with ease and good reproducibility, and relates to a cesium separation/recovery agent comprising a composite ion-exchanger with high cesium selectivity by employing a calcium alginate gel as a matrix and loading this matrix with an inorganic ion-exchanger; and to a manufacturing method therefor.

The above-described biopolymer composite ion-exchanger with high cesium selectivity is easy to handle and allows solid and liquid fractions to be easily separated, and can thus be used in sorption and separation processes based both on contact filtration and on fixed-phase sorption.

As a result of repeated and thoroughgoing research aimed at attaining the stated object, the inventors perfected the present invention upon discovering that it is possible to obtain an easy-to-handle composite ion-exchanger loaded with inorganic ion-exchangers that is highly selective to cesium and is dispersed in a calcium alginate gel, and to selectively sorb and separate/recover trace amounts of cesium from various solutions having high accompanying salt concentrations with the aid of a column packed with this exchanger.

The present invention comprises the following technical means.

(1) A cesium separation/recovery agent, comprising a composite ion-exchanger with high cesium selectivity, obtained by employing a calcium alginate gel as a matrix and loading this matrix with an inorganic ion-exchanger.

(2) A cesium separation/recovery agent according to (1) above, wherein the inorganic ion-exchanger is one selected from an ammonium molybdophosphate expressed by the general formula $(NH_4)_3PMo_{12}O_{40} \cdot nH_2O$ (where n is a mol number ranging from about 1 to 4), ammonium tungstophosphorate, and copper (II) potassium hexacyanoferrate (II).

(3) A method for manufacturing a composite ion-exchanger as defined in (1) above, which comprises dispersing an inorganic ion-exchanger powder in a sodium alginate solution to prepare a slurry, bringing a calcium salt solution into contact with the slurry to disperse and load the inorganic ion-exchanger in a calcium alginate gel substrate.

(4) A manufacturing method according to (3) above, wherein the slurry and the calcium salt solution are brought into contact with each other by the dropwise feeding of the first to the second to obtain a granular composite ion-exchanger.

(5) A manufacturing method according to (3) above, wherein the slurry and the calcium salt solution are brought into contact with each other by the extrusion molding of the first in the second to obtain a fibrous composite ion-exchanger.

(6) A manufacturing method according to (3) above, wherein the slurry is formed into a film and then the film is brought into contact with the calcium salt solution to obtain a filmlike composite ion-exchanger.

Figure 1:
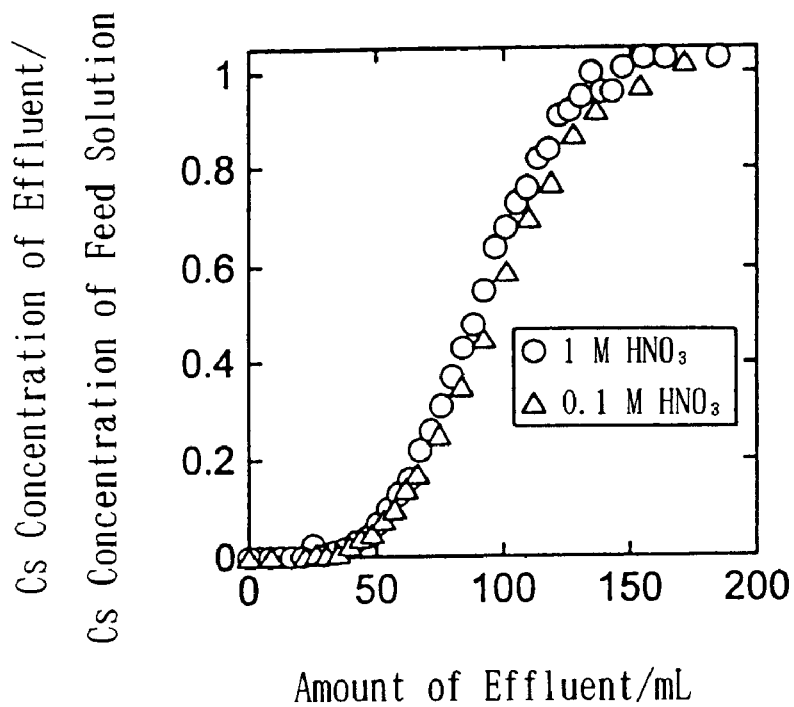
FIG. 1 is a breakthrough curve of cesium from nitric acid solution in GC-1 column.

The present invention will now be described in further detail.

Specifically, a first embodiment of the present invention resides in a cesium separation/recovery agent comprising a biopolymer composite ion-exchanger with high cesium selectivity obtained by loading and compositing a calcium alginate gel with inorganic ion-exchanger. The fact that a composite ion-exchanger with high cesium selectivity has been produced can be easily confirmed by performing powder X-ray diffraction measurements involving composited samples to detect the diffraction peaks attributable to inorganic ion-exchanger in the resulting powder X-ray diffraction pattern. The calcium alginate gel matrix itself is an X-ray amorphous substance and does not produce any diffraction peaks.

A second embodiment of the present invention resides in a method for manufacturing a composite ion-exchanger with high cesium selectivity by employing water-soluble sodium alginate as a precursor for a matrix in which the inorganic ion-exchanger is made into a composite.

Other embodiments of the present invention involve using specific methods for bringing the above-described slurry and calcium salt solution into contact with each other in order to obtain a composite ion-exchanger suited to a particular application morphology.

The biopolymer composite ion-exchanger endowed with high cesium selectivity in accordance with the present invention is an organic-inorganic composite obtained by a technique comprising a first step of adding the above inorganic ion-exchanger to a sodium alginate solution and agitating the two components to produce a slurry therefrom, and a second step of bringing this slurry into contact with a calcium salt solution, replacing the exchangeable sodium ions in the sodium alginate with calcium ions to give a calcium alginate gel, and loading the gel with dispersed the inorganic ion-exchanger.

An ammonium tungstophosphorate $(NH_4)_3PO_4 \cdot 12 (WO_3) \cdot 3H_2O$, a copper (II) potassium hexacyanoferrate (II) expressed by the general formula $K_{2-x}Cu_{x/2}[CuFe(CN)_6] \cdot nH_2O$ (where n is a mol number, and is different due to X value), basic salts of hydrotalcite and the like, acidic salts of zirconium phosphate and the like, various hydroxides, hydrated oxides and the like, and other suitable inorganic ion-exchangers may be used as the aforementioned inorganic ion-exchangers. Calcium nitrate and calcium chloride solutions may be cited as examples of the calcium salt solution. It is, however, possible to use a salt solution prepared from any organic or inorganic compound as long as this compound dissociates in solution and releases calcium ions.

The shape of the composite ion-exchanger can be adapted to a variety of application morphologies by varying the method of contact between the aforementioned slurry and calcium salt solution. The following methods may be cited as examples of methods suitable for bringing the aforementioned slurry and calcium salt solution into contact with each other: methods in which the slurry is added in drops to the calcium salt solution to give a granular composite ion-exchanger; methods in which the slurry is extrusion-molded in the calcium salt solution with the aid of an injector or the like to give a fibrous composite ion-exchanger; and methods in which the slurry is first made into a film by being applied uniformly and thinly to a flat plate, and the film is then brought into contact with the calcium salt solution to give a filmlike composite ion-exchanger.

Cesium is sorbed and separated from treatment solutions because the fine powder inorganic ion-exchanger dispersed and loaded in the organic-inorganic composite can sorb cesium ions with high selectivity. In addition, the cesium sorbed and separated from the treatment solution by the composite ion-exchanger with high cesium selectivity can be easily eluted and recovered using as the eluent a mixed solution containing an ammonium salt solution and various acid solutions, indicating that the biopolymer composite ion-exchanger provided with high cesium selectivity in accordance with the present invention is highly efficient for separating and recovering trace amounts of cesium from various treatment solutions with high concentrations of accompanying salts. Cesium can therefore be selectively separated and recovered from various treatment solutions with ease and high efficiency by employing the composite ion-exchanger endowed with high cesium selectivity in accordance with the present invention.

The biopolymer composite ion-exchanger endowed with high cesium selectivity in accordance with the present invention is a novel composite inorganic ion-exchanger that can take an arbitrary shape and that is obtained by loading and compositing a calcium alginate gel matrix with inorganic ion-exchanger.

The sodium alginate and inorganic ion-exchanger used as the starting materials are readily available and applicable commercial products. The chemical composition of the composite ion-exchanger with high cesium selectivity varies with the composition of the sodium alginate used and the loading percentage of the inorganic ion-exchanger, and cannot be expressed by a general formula. The fact that such a composite has been produced can, for example, be easily confirmed by performing powder X-ray diffraction measurements involving composited samples to identify the main diffraction peaks attributable to inorganic ion-exchanger. In addition, the fact that inorganic ion-exchangers are uniformly dispersed and loaded in the substrate gel can be easily confirmed based on infrared absorption spectra of these samples, on line analyses performed using an X-ray microanalyzer, and on measurements involving energy dispersion spectra.

Bringing the composite ion-exchanger of the present invention into contact with various cesium-containing treatment solutions causes cesium ions alone to be selectively sorbed and separated from the solutions due to the surface characteristics of the composite ion-exchanger; that is, due to the ion-sieve action of the inorganic cation-exchanger dispersed and loaded in the form of fine particles in the composite ion-exchanger. In addition, the cesium ions sorbed on the composite ion-exchanger can be easily eluted and recovered using as the eluent a mixed solution containing an ammonium salt solution and various acid solutions, and the composite ion-exchanger can be regenerated at the same time. Consequently, using the composite ion-exchanger of the present invention makes it possible to selectively, easily, and efficiently separate/recover cesium from seawater, geothermal water, radioactive wastewater, and various other solutions containing cesium ions.

DESCRIPTION OF THE PREFERRED EMBODIMENTS

EXAMPLES

The present invention will now be described through examples, but the present invention is not limited in any way by these examples.

Example 1

In this example, with regard to granular gel samples obtained by loading and compositing a calcium alginate gel with ammonium molybdophosphate, the separation/recovery capacity of two types of granular biopolymer composite ion-exchangers with high cesium selectivity produced using various drying techniques were measured and compared with that of commercially available synthetic ammonium molybdophosphate and calcium alginate matrix.

1. Production of Granular Biopolymer Composite Ion-exchange Samples With High Cesium Selectivity Biopolymer composite ion-exchanger samples provided with high cesium selectivity in accordance with the present invention were produced in the following manner.

Specifically, an appropriate amount of a commercially available sodium alginate powder was dissolved in distilled water, yielding an aqueous solution of adequate viscosity. An appropriate amount of a commercially available ammonium molybdophosphate powder was subsequently added to the aqueous solution of sodium alginate, and the system was agitated, yielding a uniform slurry. This slurry was added in drops to a calcium salt solution to replace the sodium ions in the sodium alginate with calcium ions, yielding a granular calcium alginate gel loaded with dispersed ammonium molybdophosphate. The granular calcium alginate gel thus obtained was dried to produce a biopolymer composite ion-exchanger provided with high cesium selectivity in accordance with the present invention.

Following is a description of examples in which two types of granular biopolymer composite ion-exchangers with high cesium selectivity and various bulk specific gravities were produced by varying the drying technique, which is the final step of the above-described preparation process.

1.1 Method

A commercially available sodium alginate powder (5 g; manufactured by Koso Chemical) was first added in small batches to, and dissolved in, 400 mL of distilled water; distilled water was then added to bring the total amount to 500 mL; and the system was agitated, yielding a 1 wt % aqueous solution of sodium alginate. Commercially available ammonium molybdophosphate (10 g; $(NH_4)_3PO_4.12MoO_2.3H_2O$; manufactured by Wako Junyaku; hereinafter abbreviated as "AMP") was subsequently added to 490 g of the 1 wt % aqueous solution of sodium alginate, and the system was agitated, yielding a uniform slurry with an AMP concentration of 2 wt %.

Meanwhile, commercially available calcium chloride (56 g; manufactured by Wako Junyaku) was added to, agitated, and dissolved in 400 mL of distilled water; and distilled water was then added to bring the total amount to 500 mL, yielding a 1 M (M=mol/L, hereinafter abbreviated as "M") aqueous solution of calcium chloride.

While this 1 M aqueous solution (500 mL) of calcium chloride was agitated at a constant rate (200 rpm) with a stirrer, the above-described slurry was added in drops to the solution with the aid of a constant-rate pump at a flow rate of 1.3 mL/min. After the entire amount of the slurry had been added in drops in such a manner, agitation was continued for another 30 minutes in order to stabilize the resulting gel.

The resulting granular gel was subsequently separated from the 1 M aqueous solution of calcium chloride and washed with distilled water. The washed granular gel was dried for 12 hours in a 50° C. dry oven, yielding granular biopolymer composite ion-exchanger 1 (hereinafter abbreviated as "GC-1") provided with high cesium selectivity in accordance with the present invention.

A washed granular gel obtained by the same procedure as above was first freeze-dried and then dried for 12 hours in a 50° C. dry oven, yielding granular biopolymer composite ion-exchanger 2 (hereinafter abbreviated as "GC-2") provided with high cesium selectivity in accordance with the present invention.

1.2 Results

The yields, average particle diameters, and packing volumes of the two types of samples were 17.9 g, 0.5 mm, and 15.5 mL, respectively, for GC-1; and 17.8 g, 1.2 mm, and 54.2 mL, respectively, for GC-2. The dried samples were stored in a desiccator filled with a saturated aqueous solution of ammonium chloride in order to keep the moisture content constant in each case.

According to the results of powder X-ray diffraction measurements, the loaded calcium alginate was an amorphous substance devoid of diffraction peaks, and the only diffraction peaks that could be clearly observed in the diffraction patterns of GC-1 and GC-2 were those of AMP.

2. Performance Evaluation of Granular Biopolymer Composite Ion-Exchanger Samples With High Cesium Selectivity To evaluate the performance of biopolymer composite ion-exchanger samples provided with high cesium selectivity in accordance with the present invention, treatment solutions containing various metal ions were prepared, and these were used to conduct experiments in which the distribution coefficients of the metal ions in the subject samples were measured by a batch technique, and experiments in which cesium was sorbed and separated/recovered from nitric acid solutions by a column technique.

2.1 Samples Used in Distribution and Column Experiments

The granular biopolymer composite ion-exchanger samples GC-1 and GC-2 with high cesium selectivity manufactured in 1 above, and commercially available powdered AMP ($(NH_4)_3PO_4 \cdot 12MoO_3 \cdot 3H_2O$; manufactured by Wako Junyaku) and calcium alginate matrix samples (hereinafter abbreviated as "matrices") were used as comparison samples in the distribution experiments. In addition, GC-1 was used as a composite ion-exchanger sample with high cesium selectivity in the column experiments.

2.2 Treatment Solutions Used in Distribution and Column Experiments 2.2.1 Treatment Solutions for Distribution Experiments Two types of treatment solutions were prepared. These included 1) a 1 M $NHO_3$ acidic solution containing 10 ppm cesium ions, and 2) metal ion solutions obtained by adding cesium (Cs), sodium (Na), strontium (Sr), cobalt (Co), europium (Eu), and americium (Am) nitrates, each with a metal ion concentration of 10 ppm (with the exception of Am, whose concentration was $2.1 \times 10^{-9}$ M), to $HNO_3$ acidic solutions having various acid concentrations. Infinitesimal amounts of Cs-137, Na-22, Sr-85, Co-60, Eu-152, and Am-241 were added as tracers to the aforementioned treatment solutions.

2.2.2 Treatment Solutions for Column Experiments

The treatment solutions used were obtained by adding cesium nitrate to a 0.1 M or 1 M aqueous solution of nitric acid to achieve a cesium ion concentration of $3 \times 10^{-3}$ M, and then adding Cs-137 as a tracer.

2.3 Distribution Experiments

Each of the composite ion-exchanger samples with high cesium selectivity or the comparison samples described in 2.1 above was metered out in an amount of 70 mg into a 10 mL centrifugation tube, a treatment solution for distribution experiments described in 2.2 was then added thereto in an amount of 7 mL, the product was kept for 7 days in a 25° C. thermostat under occasional mild stirring to achieve equilibrium, and solid and liquid fractions were centrifugally separated (10 minutes at 10,000 rpm). Radiation intensity in 2 mL of supernatant liquid was measured, and the distribution coefficient ($K_d$) was calculated with the aid of the following equation on the basis of variations in the radiation intensity before and after sorption.

$$K_d = [(Ai-Af)/Af]V/m \, (\text{mL/g}),$$

where Ai and Af (cpm/mL) are initial radiation intensity and equilibrium radiation intensity, respectively; m (g) is the weight of the sample, and V (mL) is the volume of the treatment solution. The above equation indicates that ion species with lower post-reaction Af-values, that is, with greater sorption on the samples, have higher $K_d$-values.

Table 1 shows measurement results concerning the distribution coefficient ($K_{d, Cs}$) of cesium in various samples obtained using 1 M $HNO_3$ acidic solutions.

TABLE 1

| Sample | Distribution coefficient of cesium, $K_{d, Cs}$ (mL/g) |
|---|---|
| Matrix: calcium alginate | 1 |
| Commercially available AMP (manufactured by Wako Junyaku) | 41,186 |
| GC-1 | 23,790 |
| GC-2 | 23,776 |

As can be seen in Table 1, substantially no cesium is distributed on the matrix in a 1 M $HNO_3$ solution. By contrast, the $K_{d, Cs}$ values of commercially available AMP, GC-1, and GC-2 are on the order of $10^4$, that is, are significant as distribution coefficients from 1 M $HNO_3$ solutions. The bulk densities of GC-1 and GC-2 differ by a factor of about 3.5, but these is no significant difference between their $K_{d, Cs}$ values. From the results in Table 1, it is evident that the exceptionally high selective uptake of cesium ions by GC-1 and GC-2 is due to the loading of the samples with dispersed AMP.

Table 2 shows measurement results concerning distribution coefficients ($K_{d, Mn^+}$) of Cs, Sr, Co, Eu, Am, and Na from $HNO_3$ acidic solutions of various concentrations in GC-1.

TABLE 2

| | Distribution coefficient, Kd, Mn+ (mL/g) | | | | | |
|---|---|---|---|---|---|---|
| [HNO$_3$], M | Cs | Sr | Co | Eu | Am | Na |
| 0.01 | 45,404 | 60 | 13 | 110 | 227 | <1 |
| 0.1 | 29,635 | <1 | 3 | 84 | 39 | 4 |
| 1 | 23,790 | <1 | 1 | <1 | 4 | <1 |
| 5 | 6,742 | <1 | 2 | <1 | <1 | <1 |

The results in Table 2 indicate that whereas polyvalent metal ions such as Am or Eu are sorbed only slightly from solutions having a low $HNO_3$ concentration (0.1 M or lower), the distribution coefficient of Cs is much higher than that of any other type of metal ion at any $HNO_3$ concentration, and GC-1 has exceptionally high selectivity for Cs.

2.4 Column Experiments 1.00 g GC-1 was packed into a glass column with an inside diameter of 0.7 cm (sample volume=2.6 mL, height of packed layer: 6.8 cm), and a 25° C. aqueous feed solution ($3 \times 10^{-3}$ M $CsNO_3$–0.1 M or 1 M $HNO_3$) was passed through the column at a flow rate of 0.21 mL/min. The γ-activity of Cs-137 in the fraction-collected effluent was measured, and a breakthrough curve of cesium plotted. The aforementioned feed solution ($3\times10_{-3}$ M $CsNO_3$–1 M $HNO_3$) was passed under the same conditions, 25° C. 2.5 M $NH_4NO_3$–2.5 M $HNO_3$ was passed as an eluant through a 1.00-g GC-1 column in which 0.24 mmol/g cesium had been sorbed, the γ-activity of Cs-137 in the fraction-collected effluent was measured, and an elution curve of sorbed cesium was plotted.

Figure 2:
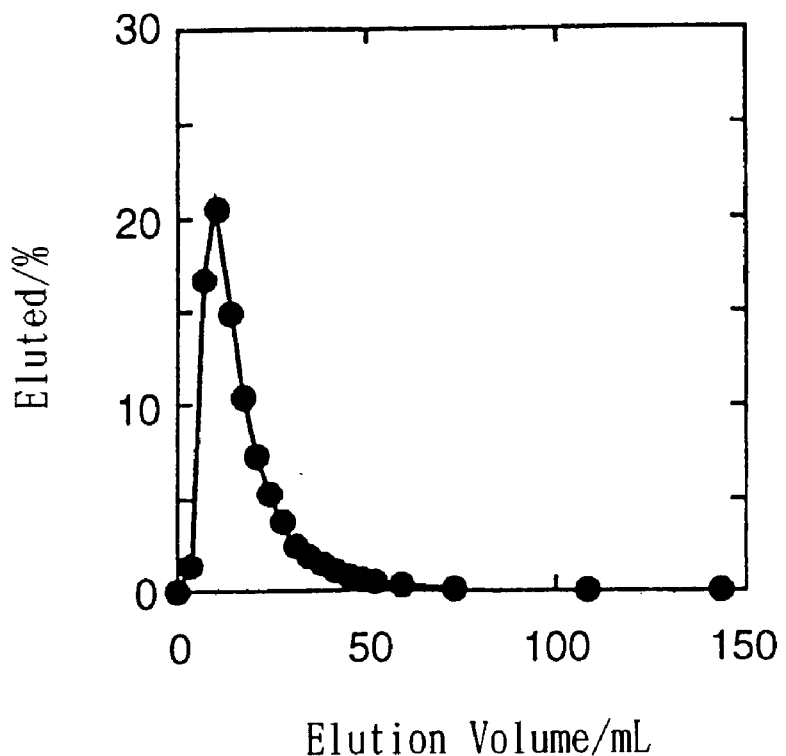
FIG. 2 is an elution curve of cesium from GC-1 column.

Breakthrough curves and elution curves of cesium are depicted in FIGS. 1 and 2, respectively.

It is evident in FIG. 1 that adequate S-shaped breakthrough curves could be obtained in all cases and that the effect of nitric acid concentration on breakthrough capacity was relatively small. It can be seen that trace amounts of cesium could be selectively sorbed and separated from 37 mL of a 1 M nitric acid solution (5% breakthrough, corresponding to about 14-fold amount of packed volume) with a mere 1-g GC-1 column. The saturation sorption capacity of cesium was determined on the basis of a breakthrough curve (1 M $HNO_3$ system) in FIG. 1 and was found to be 0.24 mmol/g.

It could also be seen in FIG. 2 that the cesium selectively sorbed by the GC-1 column from the feed solution ($3\times10^{-3}$ M $CsNO_3$–1 M $HNO_3$) could be eluted and recovered substantially completely (elution percentage: 92.2%) by passing 140 mL of a mixed solution comprising 2.5 M $NH_4NO_3$ and 2.5 M $HNO_3$. In addition, the GC-1 column could be used repeatedly because it could be regenerated simultaneously with cesium elution.

Example 2

In this example, with regard to granular gel samples obtained by loading and compositing a calcium alginate gel with ammonium tungstophosphorate (WP), copper (II) potassium hexacyanoferrate (II) (CuFC), the separation/recovery capacity of two types of granular biopolymer composite ion-exchangers with high cesium selectivity were measured and compared with that of commercially available WP, synthetic CuFC and calcium alginate matrix.

1. Production of Granular Biopolymer Composite Ion-exchange Samples With High Cesium Selectivity Biopolymer composite ion-exchanger samples provided with high cesium selectivity in accordance with the present invention were produced in the following manner.

Specifically, an appropriate amount of a commercially available sodium alginate powder was dissolved in distilled water, yielding an aqueous solution of adequate viscosity. An appropriate amount of a commercially available WP, synthetic CuFC powder was subsequently added to the aqueous solution of sodium alginate, and the system was agitated, yielding a uniform slurry. This slurry was added in drops to a calcium salt solution to replace the sodium ions in the sodium alginate with calcium ions, yielding a granular calcium alginate gel loaded with the above dispersed inorganic ion-exchanger. The granular calcium alginate gel thus obtained was dried to produce a biopolymer composite ion-exchanger provided with high cesium selectivity in accordance with the present invention.

Following is a description of examples in which two types of granular biopolymer composite ion-exchangers with high cesium selectivity were produced.
1.1 Method
(1) Preparation of Calucium Alginate—Ammonium Tungstophosphorate Composite A sodium alginate powder 10 g (manufactured by Koso Chemical) and commercially available ammonium tungstophorate (($NH_4$)$_3PO_4$.12($WO_3$).$3H_2O$; manufactured by Wako Junyaku) 10 g were added to 1 L of distilled water, and the system was agitated, yielding a uniform slurry.

Meanwhile, commercially available calcium chloride 28 g (manufactured by Wako Junyaku) was added to, agitated, and dissolved in 400 mL of distilled water; and distilled water was then added to bring the total amount to 500 mL, yielding a 0.5 M (M=mol/L, hereinafter abbreviated as "M") aqueous solution of calcium chloride.

While this 0.5 M aqueous solution (500 mL) of calcium chloride was agitated at a constant rate (200 rpm) with a stirrer, the above-described slurry was added in drops to the solution with the aid of a constant-rate pump at a flow rate of 2 mL/min. After the entire amount of the slurry had been added in drops in such a manner, agitation was continued for another 30 minutes in order to stabilize the resulting gel.

The resulting granular gel was subsequently separated from the 0.5 M aqueous solution of calcium chloride and washed with distilled water. The washed granular gel was dried for 12 hours in a 50° C. dry oven, yielding granular biopolymer composite ion-exchanger 3 (hereinafter abbreviated as "GC-3") provided with high cesium selectivity in accordance with the present invention.
(2) Preparation of Calcium Alginate—Copper (II) Potassium Hexacyanoferrate (II) (CUFC) Composite A commercially available sodium alginate powder 5 g (manufactured by Koso Chemical) was first added in small batches to, and dissolved in, 400 mL of distilled water; distilled water was then added to bring the total amount to 500 mL; and the system was agitated, yielding a 1 wt % aqueous solution of sodium alginate.

Next, copper (II) potassium hexacyanoferrate (II) ($K_{2-x}Cu_{k/2}$[Cu Fe $(CN)_6$].$nH_2O$) 2 g, which was produced according to a conventional method (Separation Science and Technology, 34 (1), 17–28 (1999)), was subsequently added to 100 mL of the 1 wt % aqueous solution of sodium alginate, and then the system was agitated, yielding a uniform slurry.

The above-described slurry was added in drops to 0.5 M aqueous solution of calcium chloride by the same way as described in the above (1), and then the resulting granular gel was washed with distilled water and then dried, yielding granular biopolymer composite ion-exchanger 4 (hereinafter abbreviated as "GC-4") provided with high cesium selectivity in accordance with the present invention.
1.2 Results The dried samples were stored in a desiccator filled with a saturated aqueous solution of ammonium chloride in order to keep the moisture content constant in each case.

According to the results of powder X-ray diffraction measurements, the loaded calcium alginate was an amorphous substance devoid of diffraction peaks, and the only diffraction peaks that could be clearly observed in the diffraction patterns of GC-3 and GC-4 were those of ammonium tungstophosphorate and copper (II) potassium hexacyanoferrate (II) respectively.

2. Performance Evaluation of Granular Biopolymer Composite Ion-Exchanger Samples With High Cesium Selectivity To evaluate the performance of biopolymer composite ion-exchanger samples provided with high cesium selectivity in accordance with the present invention, treatment solutions containing various metal ions were prepared, and these were used to conduct experiments in which the distribution coefficients of the metal ions in the subject samples were measured by a batch technique, and experiments in which cesium was sorbed and separated/recovered from nitric acid solutions by a column technique.

2.1 Samples Used in Distribution and Column Experiments

As the granular biopolymer composite ion-exchanger samples, GC-3 and GC-4 with high cesium selectivity manufactured in 1 above were used, and commercially available powdered WP, synthetic CuFC, and calcium alginate matrix samples (hereinafter abbreviated as "matrices") were used as comparison samples in the distribution experiments. In addition, GC-3 was used as a composite ion-exchanger sample with high cesium selectivity in the column experiments.

2.2 Treatment Solutions Used in Distribution and Column Experiments 2.2.1 Treatment Solutions for Distribution Experiments Two types of treatment solutions were prepared. These included 1) a 1 M $NHO_3$ acidic solution containing 10 ppm cesium ions, and 2) metal ion solutions obtained by adding cesium (Cs), sodium (Na), strontium (Sr), cobalt (Co), europium (Eu), and americium (Am) nitrates, each with a metal ion concentration of 10 ppm (with the exception of Am, whose concentration was $2.1 \times 10^{-9}$ M), to $HNO_3$ acidic solutions having various acid concentrations. Infinitesimal amounts of Cs-137, Na-22, Sr-85, Co-60, Eu-152, and Am-241 were added as tracers to the aforementioned treatment solutions.

2.2.2 Treatment Solutions for Column Experiments

The treatment solutions used were obtained by adding cesium nitrate to acidic aqueous solution mixtures of nitric acid and nitrate of 1 M $HNO_3$–4.5 M $NaNO_3$ to achieve a cesium ion concentration of $7.5 \times 10^{-5}$ M, and then adding Cs-137 as a tracer.

2.3 Distribution Experiments

Each of the composite ion-exchanger samples with high cesium selectivity or the comparison samples described in 2.1 above was metered out in an amount of 70 mg into a 10 mL centrifugation tube, a treatment solution for distribution experiments described in 2.2 was then added thereto in an amount of 7 mL, the product was kept for 7 days in a 25° C. thermostat under occasional mild stirring to achieve equilibrium, and solid and liquid fractions were centrifugally separated (10 minutes at 10,000 rpm). Radiation intensity in 2 mL of supernatant liquid was measured, and the distribution coefficient ($K_d$) was calculated with the aid of the following equation on the basis of variations in the radiation intensity before and after sorption.

$$K_d = [(Ai - Af)/Af]V/m \text{ (mL/g)},$$

where Ai and Af (cpm/mL) are initial radiation intensity and equilibrium radiation intensity, respectively; m (g) is the weight of the sample, and V (mL) is the volume of the treatment solution. The above equation indicates that ion species with lower post-reaction Af-values, that is, with greater sorption on the samples, have higher $K_d$-values.

Table 3 shows measurement results concerning the distribution coefficent ($K_{d, Cs}$) of cesium in various samples obtained using 1 M $HNO_3$ acidic solutions.

TABLE 3

| Samples | Distribution coefficient of cesium: Kd, c$_s$ (mL/g) |
|---|---|
| Matrix: Calucium Alginate | 1 |
| WP (Wako Junyaku) | 79792 |
| WP-Alg | 45057 |
| Synthesized CuFC | 5762 |
| CuFC-Alg | 2468 |

As can be seen in Table 3, substantially no cesium is distributed on the matrix in a 1 M $HNO_3$ solution. By contrast, the $K_{d, Cs}$ values of commercially available WP, GC-3 (WP-Alg) are on the order of $10^4$, and that of synthetic CUFC, GC-4 (CuFC-Alg) are on the order of $10^3$, that are significant as distribution coefficients from 1 M $HNO_3$ solutions. From the results in Table 3, it is evident that the exceptionally high selective uptake of cesium ions by GC-3 and GC-4 is due to the loading of the samples with dispersed WP and CUFC.

Table 4 shows measurement results concerning distribution coefficients ($K_{d, Mn^+}$) of Cs, Sr, Co, Eu, Am, and Na from $HNO_3$ acidic solutions of various concentrations in GC-3.

TABLE 4

| [HNO$_3$], M | Distribution coefficient: Kd, Mn+ (mL/g) | | | | | |
|---|---|---|---|---|---|---|
| | Cs | Sr | Co | Eu | Am | Na |
| 0.01 | 9403 | 480 | 47 | 14 | 98 | 8.3 |
| 0.1 | 335357 | 1 | 5 | <1 | <1 | <1 |
| 1 | 45057 | <1 | 1 | <1 | 3 | 2 |
| 5 | 10164 | 2 | <1 | <1 | 3 | <1 |

The results in Table 4 indicate that whereas polyvalent metal ions such as Sr or Am are sorbed only slightly from solutions having a low $HNO_3$ concentration (0.01 M or lower), the distribution coefficient of Cs is much higher than that of any other type of metal ion at any $HNO_3$ concentration, and GC-3 has exceptionally lectivity for Cs.

Table 5 shows measurement results concerning distribution coefficients ($K_{d, Mn^+}$) of Cs, Sr, Co, Eu, Am, and Na from 1 M $HNO_3$ solution in GC-4.

TABLE 5

| [HNO$_3$], M | Distribution coefficient: Kd, Mn+ (mL/g) | | | | | |
|---|---|---|---|---|---|---|
| | Cs | Sr | Co | Eu | Am | Na |
| 1 | 2468 | <1 | 7 | 2 | 3 | 6 |

The results in Table 5 indicate that the distribution coefficient of Cs is much higher than that of any other type of metal ion, and GC-4 has exceptionally high selectivity for Cs.

2.4 Column Experiments 1.00 g GC-3 was packed into a glass column with an inside diameter of 0.7 cm (sample volume=3.6 mL, height of packed layer: 9.4 cm), and a 25° C. aqueous feed solution ($7.5 \times 10^{-5}$ M $CsNO_3$–4.5 M $NaNO_3$–1 M $HNO_3$) was passed through the column at a flow rate of 0.21 mL/min. The γ-activity of Cs-137 in the fraction-collected effluent was measured, and a breakthrough curve of cesium plotted. The aforementioned feed solution ($7 \times 10^{-5}$ M $CsNO_3$–4.5 M $NaNO_3$–1 M $HNO_3$) was passed under the same conditions, 25° C. 5 M $NH_4NO_3$'1 M $HNO_3$ was passed as an eluant through a 1 g GC-3 column in which 0.013 mmol/g cesium had been sorbed, the γ-activity of Cs-137 in the fraction-collected effluent was measured, and an elution curve of sorbed cesium was plotted.

Figure 3:
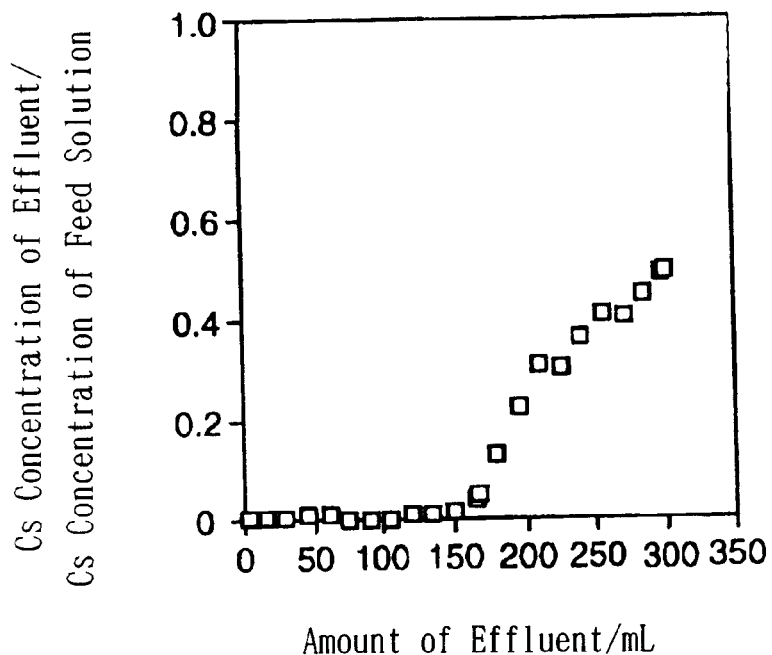
FIG. 3 is a breakthrough curve of cesium from a mixed solution of $NaNO_3$ and $HNO_3$ in GC-3 column.
Figure 4:
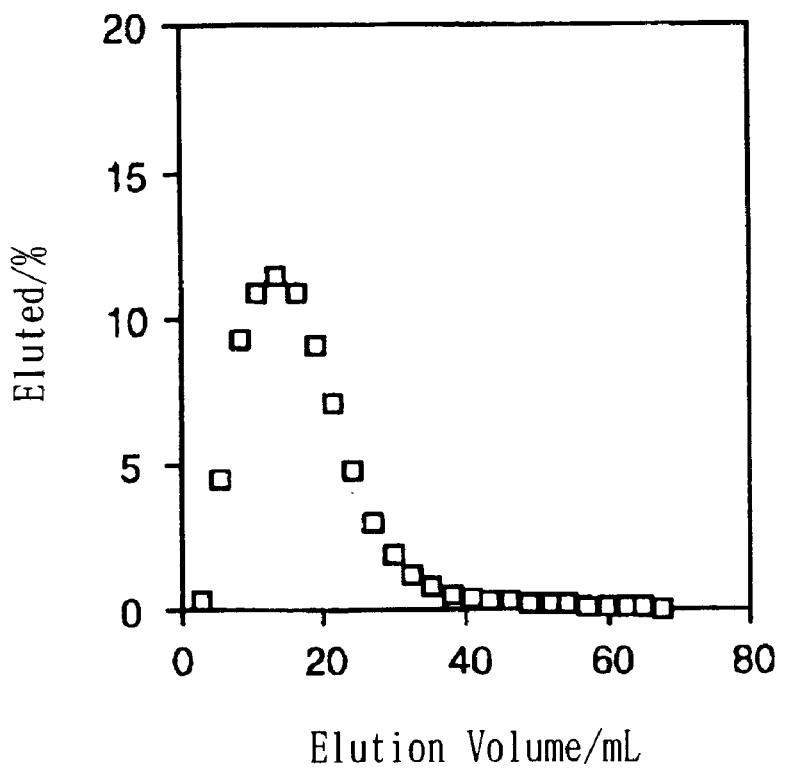
FIG. 4 is an elution curve of cesium from GC-3 column.

Breakthrough curves and elution curves of cesium are depicted in FIGS. 3 and 4, respectively.

It is evident in FIG. 3 that trace amounts of cesium could be selectively sorbed and separated from 169 mL of a 4.5 M $NaNO_3$–1 M $HNO_3$ solution (5% breakthrough, corresponding to about 47-fold amount of packed volume) with a mere 1-g GC-3 column. The saturation sorption capacity of cesium was determined on the basis of a breakthrough curve in FIG. 3 and was found to be $1.26 \times 10^{-2}$ mmol/g.

It could also be seen in FIG. 4 that the cesium selectively sorbed by the GC-3 column from the feed solution ($7.5 \times 10^{-5}$ M $CsNO_3$–4.5 M $NaNO_3$–1 M $HNO_3$) could be eluted and recovered substantially completely (elution percentage: 77%) by passing 68 mL of a mixed solution comprising 5 M $NH_4NO_3$–1 M $HNO_3$. In addition, the GC-3 column could be used repeatedly because it could be regenerated simultaneously with cesium elution.

As described above, the biopolymer composite ion-exchanger provided with high cesium selectivity in accordance with the present invention is easy to handle, has excellent sorption performance, and can be produced extremely easily and with good reproducibility. Bringing the ion-exchanger into contact with a treatment solution will therefore allow cesium to be selectively separated/recovered from the treatment solution irrespective of the solution contact method due to ion-exchanger characteristics of the biopolymer composite ion-exchanger with high cesium selectivity, that is, due to the unique ion-exchange action of the loaded inorganic ion-exchanger dispersed in microparticulate form throughout the biopolymer composite ion-exchanger with high cesium selectivity. Consequently, using this biopolymer composite ion-exchanger with high cesium selectivity makes it possible to selectively separate/recover cesium from treatment solutions containing trace amounts of cesium, such as seawater, geothermal water, and radioactive wastewater.

What is claimed is:

1. A method for manufacturing a composite ion-exchanger with high cesium selectivity, which comprises dispersing at least one inorganic ion-exchanger powder selected from the group consisting of crystalline tetratitanic acid, insoluble ferrocyanides, ammonium molybdophosphate, silicon titanates, copper (II) potassium hexacyanoferrate (II), and ammonium tungstophosphate in a sodium alginate aqueous solution to prepare a slurry, bringing a calcium salt solution into contact with said slurry to disperse and load the inorganic ion-exchanger in a calcium alginate gel substrate.

2. A manufacturing method according to claim 1, wherein the slurry and the calcium salt solution are brought into contact with each other by the dropwise feeding of the first to the second to obtain a granular composite ion-exchanger.

3. A manufacturing method according to claim 1, wherein the slurry and the calcium salt solution are brought into contact with each other by the extrusion molding of the first in the second to obtain a fibrous composite ion-exchanger.

4. A manufacturing method according to claim 1, wherein the slurry is formed into a film and then the film is brought into contact with the calcium salt solution to obtain a filmlike composite ion-exchanger.

\* \* \* \* \*